United States Patent [19]

Amaral et al.

[11] Patent Number: 5,169,708

[45] Date of Patent: Dec. 8, 1992

[54] HEAT SHRINKABLE, ELASTIC, GLUEABLE POLYETHYLENE AND ETHYLENE VINYL ACETATE FILM

[75] Inventors: Everson Amaral, Sao Jose dos Campos, Brazil; Ralf Korpman, Bridgewater, N.J.

[73] Assignee: Chicopee, New Brunswick, N.J.

[21] Appl. No.: 869,986

[22] Filed: Apr. 16, 1992

Related U.S. Application Data

[62] Division of Ser. No. 432,834, Nov. 7, 1989.

[51] Int. Cl.⁵ ............................................. B32D 7/02
[52] U.S. Cl. ................................... 428/215; 428/520; 428/910; 264/160
[58] Field of Search ................ 428/516, 520, 215, 910

[56] References Cited

U.S. PATENT DOCUMENTS

| | | | |
|---|---|---|---|
| 4,364,981 | 12/1982 | Horner et al. | 428/33 |
| 4,399,173 | 8/1983 | Anthony et al. | 428/35 |
| 4,399,180 | 8/1983 | Briggs | 428/212 |
| 4,579,696 | 4/1986 | Di Luccio | 264/171 |

*Primary Examiner*—Edith Buffalow

[57] ABSTRACT

A process is provided for producing a novel two layered or three-layered film of polyethylene and ethylene vinyl acetate copolymer which is heat shrinkable, and after heat shrinking, is elastic and glueable. The process involves uniaxially stretching under controlled, relatively low temperature conditions.

4 Claims, 1 Drawing Sheet

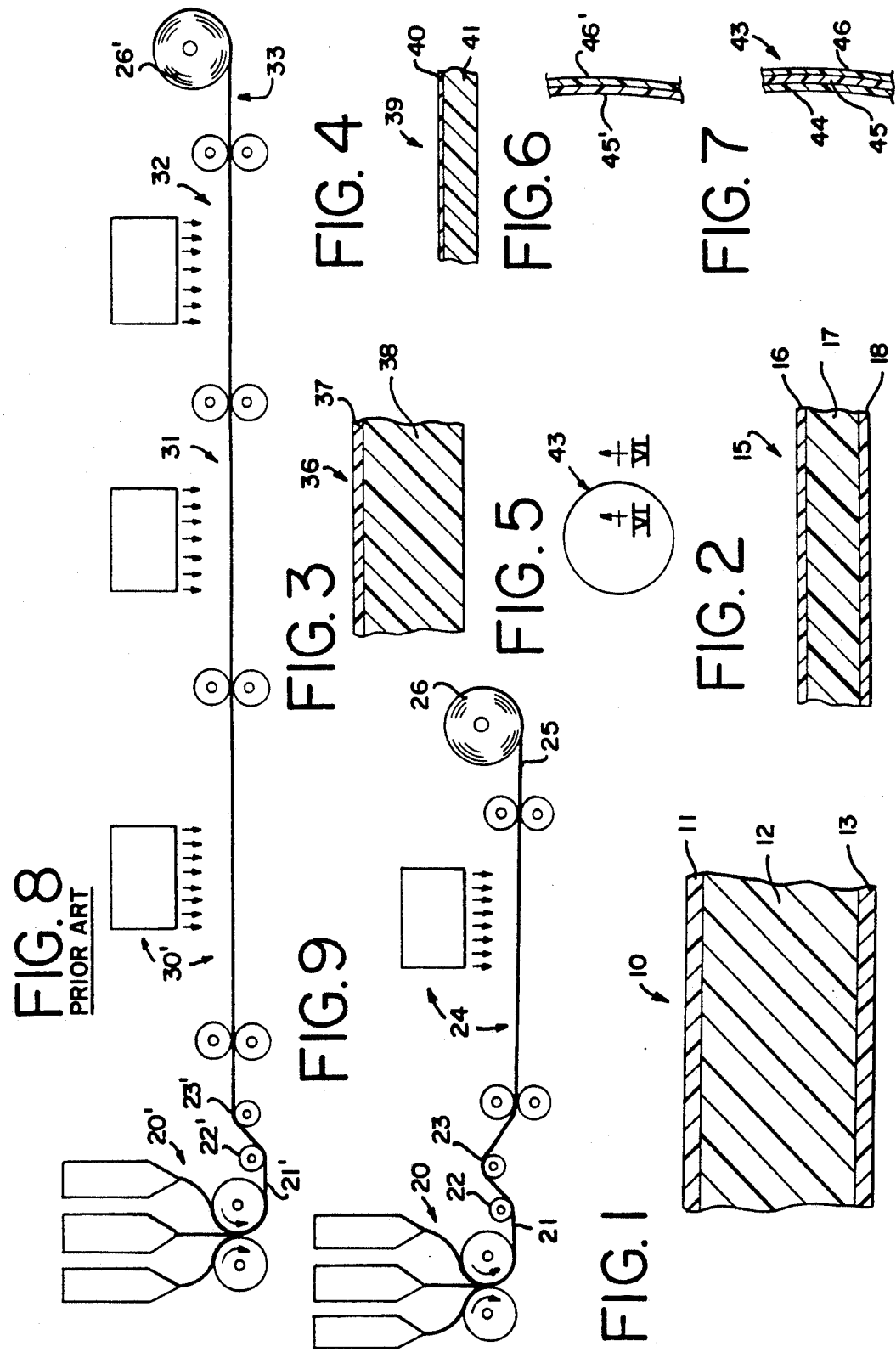

HEAT SHRINKABLE, ELASTIC, GLUEABLE POLYETHYLENE AND ETHYLENE VINYL ACETATE FILM

This is a division of application Ser. No. 432,834, filed Nov. 7, 1989, which is hereby incorporated by reference.

FIELD OF THE INVENTION

This invention lies in the field of heat shrinkable films of polyethylene and ethylene vinyl acetate.

PRIOR ART

Films with laminated respective layers of a polyethylene polymer (PE) and of an ethylene vinyl acetate (EVA) copolymer are known. For example, Lutzmann Canadian Patent No. 880,848 (issued Sep. 14, 1971) describes films of ethylene vinyl acetate coated with low density (about 0.910 to about 0.925 grams per cubic centimeter) PE for packaging uses. Also, Benning in his book "Plastic Films for Packaging" (Technomic Publishing Company, Inc., copyright 1983) describes coextruded films of EVA and low density polyethylene (LDPE) on pp. 89 and 90 for packaging uses. For another example, Pomplun et. al., U.S. Pat. No. 4,816,094 describes heat shrinkable elastomers which incorporate a copolymer having hard block and elastomeric soft block polymer segments.

Baird et al U.S. Pat. No. 3,022,543 describes preparation of a shrink-wrap type of thick walled Polyethylene tube that is, according to Benning (supra, pp. 67-68), suitable for frozen turkey packaging. The PE is irradiated to cross-link such, thereby increasing tensile strength, orientation release stress, and hot-sealing range. The irradiation is accomplished before an extruded PE tube is oriented in bubble form. Thereafter, the cross-linked film can be stretched, but no longer becomes fluid at its original melting point of 105°-110° C. However, the film remains shrinkable with a relatively high orientation release stress in boiling water (at 100° C.).

LDPE is a well known packaging film for shrink or stretch wrap. Also, a resin blend of 70 percent LDPE and 30 percent high density polyethylene (HDPE) has been sold by DuPont since the early 1960's (according to Benning, supra, at pp. 74-75), and such blend can be processed into a film whose orientation is reportedly threefold in each direction at temperatures between about 90° and 130° C. Linear low density polyethylene (LLDPE) can be used alone or in combination with LDPE and HDPE for stretch and shrink packaging film applications (see Benning, supra, pp. 80-88).

EVA stretch films are well known. Impact strength increases with vinyl acetate (VA) content and molecular weight. "The polymers become less crystalline, are more elastic, and possess the tendency to block at the higher VA levels" (Benning, op. cit., p. 92).

So far as now known, neither unitary films of either polyethylene or of ethylene vinyl acetate, nor coextruded films having layers of polyethylene and ethylene vinyl acetate have heretofore been known which have the following combination of properties:
 a) heat shrinkability;
 b) elasticity after being heat shrunk; and
 c) glueability.

BRIEF SUMMARY OF THE INVENTION

The present invention relates to a process for producing heat shrinkable two-layered and three-layered film structures comprised of layers of polyethylene and of ethylene vinyl acetate, and to the film structures so produced.

Such a film structure, after being preliminarily uniaxially stretched, and then preferably heat set, is heat shrinkable, and, in its heat shrunk state, is elastic and glueable, and to the film structures so produced.

The process utilizes the step of uniaxially stretching a starting two-layered or three-layered film comprised of successive interbonded layers of polyethylene, and ethylene vinyl acetate. In a three-layered structure, a layer of polyethylene is bonded to each opposed face of a layer of ethylene vinyl acetate. The uniaxial stretching is carried out within a predetermined range of stretch ratios and within a Predetermined relatively low temperature range. Optionally but preferably the product so stretched film is heat set under controlled conditions of stretching and temperature.

A starting two or three-layered film is conveniently prepared by coextruding the polyethylene layer(s) with a layer of ethylene vinyl acetate.

The product film so produced is characterized by an unusual and very useful combination of heat shrinkability, elastic recovery, and glueability, all as described below, and is new and very useful.

One advantage of the process is that it can be practiced in a reliable manner with conventional film forming and processing apparatus so that the development and cost of new and specialized apparatus is avoided.

One advantage of the Product film is that it is prepared from known and even commercially available starting materials so that the development of new and costly polymeric starting materials is avoided.

The product film is believed to be particularly useful as an elastic retaining or supporting member suitable for incorporation into disposable garments, such as diapers, disposable surgical garments, and the like, which are held in body contact or secured in place or position by an incorporated elastic member, such as an elastic waist or arm band.

BRIEF DESCRIPTION OF DRAWINGS

In the drawings:

FIG. 1 is an enlarged fragmentary vertical sectional view through one embodiment of a three-layered starting film adapted for use in the practice of this invention;

FIG. 2 is a view similar to FIG. 1 showing the embodiment of FIG. 1 after such has been processed in accord with this invention into a product film;

FIG. 3 is a view similar to FIG. 1 but showing a two-layered starting film adapted for use in the practice of this invention;

FIG. 4 is a view similar to FIG. 2 but showing the appearance of the film of FIG. 3 after processing in accord with this invention;

FIG. 5 is a diagrammatic transverse sectional view through a multilayered tube in the region of the bubble in the bubble tower of a film making process;

FIG. 6 is an enlarged diagrammatic view of a small section of the wall of the tube shown in FIG. 5, taken in the region VI—VI of FIG. 5, showing a two layered film;

FIG. 7 is a view similar to FIG. 6 but showing a three layered film;

FIG. 8 is a diagrammatic representation of a prior art manufacturing line for continuously preparing a multi-layered film; and FIG. 9 is a view similar to FIG. 8 but showing a manufacturing line for making a multi-layered film of this invention.

DETAILED DESCRIPTION

Referring to FIG. 1, there is seen illustrated in vertical section a diagrammatic embodiment of a preferred starting three-layered film structure suitable for use as a starting material in the practice of the present invention which film is designated in its entirety by the numeral 10. Film 10 is conveniently produced by coextrusion and comprises three layers identified as 11, 12 and 13. Layers 11 and 13 are each comprised of a polyethylene polymer selected from the group consisting of low density polyethylene and linear low density polyethylene. Optionally, such layers 11 and 13 can additionally each contain up to about 50 weight percent of ethylene vinyl acetate on a total individual such respective layer weight basis. Also optionally, such layers 10 and 13 can additionally contain up to about 10 weight percent of a filler based antiblocking agent on a total individual such respective layer weight basis. Preferably, layers 11 and 13 are comprised on a 100 weight percent basis of:

(a) about 50 to about 100 weight percent of a polyethylene polymer selected from the group consisting of low density polyethylene, and linear low density polyethylene, as these polymer types are conventionally known and described (see, for example, Modern Plastics Encyclopedia, 1989 edition at pp. 63-72, McGraw Hill, copyright 1988), (b) 0 to about 50 weight percent of ethylene vinyl acetate copolymer having a molecular weight in the range of about 10,000 to about 75,000 and comprised on a weight percent copolymer basis of about 72 to about 91 weight percent ethylene, and correspondingly, about 9 to about 28 weight percent vinyl acetate, and (c) 0 to about 10 weight percent of a particulate filler based antiblocking agent.

Filler based antiblocking agents characteristically stay dispersed in the layer polymer matrix and control blocking without interfering with, for example, adhesive. Examples of filler based antiblocking agents include clay based agents, silica based agents, and the like. Filler based antiblocking agents are differentiated from antislip agents, such as organic compounds dissolved in the polymer matrix. Antislip agents migrate to the layer surface and interfere with glueability.

Layer 12 is comprised of an ethylene vinyl acetate copolymer, as this polymer type is conventionally known and described (see, for example, Modern Plastics Encyclopedia, 1989 edition at pp. 74-76). Preferably, the particular ethylene vinyl acetate polymer employed in layer 12 is an ethylene vinyl acetate polymer such as is above characterized for inclusion in a layer 11 or 13.

Preferably layer 11 and layer 13 have identical compositions and identical thicknesses. In coextrusion, one uses multiple extruders and specialized die systems, as those skilled in the art appreciate.

A starting film 10 of FIG. 1 has a thickness in the range of about 3 to about 7 mils, and preferably in the range of about 4 to about 6 mils. In a film 10, the ratio of the thickness of either respective one of such outside layers 11 or 13 to such mid layer 12 is preferably in the range of about 1:5 to about 1:20, and more preferably is in the range of about 1:8 to about 1:12.

Referring to FIG. 3, there is seen illustrated in vertical section a diagrammatic embodiment of a representative two-layered film structure suitable for use as a starting material in the practice of the present invention which film is designated in its entirety by the numeral 36. Film 36 is conveniently produced by coextrusion and comprises two layers identified as 37 and 38. Layer 37 is comparable to either layer 11 or 13 of film 10 and is similarly comprised. Layer 38 is comparable to layer 12 of film 10 and is similarly comprised.

The ratio of the thickness of the layer 37 to the layer 38 is in the range of about 1.5 to about 1:20, and is Preferably in the range of about 1:8 to about 1:12.

A film 10 or a film 36 after being produced by coextrusion is unilaterally stretched (that is, stretched in one direction) to an extent such that the stretch ratio is in the range of about 3:1 to about 6:1, and preferably is in the range of about 4:1 to about 5:1. The stretching is accomplished while maintaining the film 10 or the film 36 at a temperature in the range of about 20° to about 50° C. and preferably in the range of about 25° to about 35° C. (i.e., room temperature processing is preferred).

For purposes of this invention, the term "stretch ratio" has reference to the ratio of the initial film length to the final stretched film length measured while the film is still under tension, the measurement being taken in the direction of stretch (whether stretching is accomplished longitudinally or crosswise relative to the direction of extrusion). If tension is released, a film will contract to less than the width used for stretch ratio determination unless the film is heat set.

When longitudinally heat shrinkable strips of a product film are contemplated, it is presently preferred to accomplish uniaxial stretching in the transverse or crosswise direction relative to the longitudinal direction of extrusion.

Unilateral stretching of a film-like starting structure can be accomplished by using a tenter process. The tenter is equipped with rubber shoes to avoid film tearing.

After being unilaterally stretched, a film-like starting structure is preferably heat set.

By the term "heat set" as used herein reference is had to the procedure by which the stretched film is maintained (that is, held) at a preferably slightly elevated temperature (relative to the stretching temperature) in its so stretched condition. Suitable heat set temperatures are in the range of about 38° up to about 55° C. Above about 55° C., a film tends to loose elasticity. Suitable exposure times for accomplishing heat setting are in the range of about 5 to about 15 seconds.

It is presently preferred to extrude and roll up film, and to separately let off to cross stretch and heat set.

Product films are illustrated in FIGS. 2 and 4. A three-layered product film is designated in its entirety by the numeral 15 in FIG. 2, and a two-layered product film is designated in its entirety by the numeral 39 in FIG. 4. Film 15 preferably has a thickness in the range of about 1 to about 2.5 mils, and more preferably in the range of about 1.5 to about 2 mils. Film 39 preferably has a thickness in the range of about 1 to about 2.5 mils, and more preferably in the range of about 1.5 to about 2 mils. Thus, the thickness of product film 15 or of a product film 39 is seen to be substantially reduced relative to the thickness of a starting film 10 or 39, respectively. Similarly, the layers 16 and 18 of film 15 are reduced in thickness as is the thickness of the mid-layer 17, compared to the corresponding layers 11, 12 and 13 in film 10, and layers 40 and 41 are reduced in thickness relative to layers 37 and 38, respectively, in film 39. In a film 15, the ratio of the thickness of either respective resulting such outside layer 16 or 18 to the thickness of the resulting inside or mid layer 17 is preferably in the range of about 1:5 to about 1:20, and more preferably in the range of about 1:8 to about 1:12, and, in film 39, the ratio of the thickness of such resulting layer 40 to resulting layer 41 is preferably in the range of about 1:5 to about 1:20, and more preferably in the range of about 1:8 to about 1:12.

A film 10 or a film 36 is preferably unilaterally stretched and also heat set in the crosswise or transverse direction. Such a product stretched film can then, if desired, be first slit longitudinally into strips of desired widths, and then thereafter such strips are cut transversely into preferably rectangular shapes which are individually longitudinally heat shrinkable. Such rectangular shapes are suitable for use in the fabrication of waist bands for disposable diapers, or the like, for example.

Referring to FIG. 9, there is seen a schematic illustration of an embodiment of a presently preferred production line for continuously producing a type of product film 15 of this invention. Coextruder apparatus 20 continuously produces a three-layered film 21 which is similar to film 10. Film 21, after passage over a chill roll 22, and then through a trimmer station 23, enters a stretching and heat setting zone 24, such as is achievable with a conventional continuously operated tenter frame (not detailed). In zone 24, the film is first transversely stretched under relatively low temperatures (as indicated above) after which the film can be heat set by being subjected to reduced transverse stretching force and controlled temperature. Thereafter, the stretched and heat set film 25 is convolutely wound on a roll 26. The roll 26 is then conveniently slit transversely at prechosen locations to provide wound strips of film 15 having desired widths (not shown).

These strips 15 are suitable for use in automatic equipment being used for fabricating disposable garments, sanitary devices, such as disposable diapers, or the like. In such equipment, such strips can be transversely cut in a serial manner by a successive series of longitudinally spaced, parallel, sequential excises, thereby to produce the presently Preferred generally rectangularly configured film segments which are each heat shrinkable in their respective longitudinal direction.

Referring to FIG. 8, there is seen, for present comparison purposes, a schematic illustration of what is believed to be an embodiment of a production line suitable for use in practicing a representative prior art process that could be used for processing a similarly compounded and coextruded film. Similar components of this line are similarly numbered relative to the components of the line in FIG. 9, but with the addition of prime marks thereto. Thus, coextruder apparatus 20' continuously produces a three-layered film 21' which after passage over a chill roll 22' and through a trimmer station 23 enters a stretching zone 30 wherein the film is uniaxially stretched at a temperature, such as 150° F. Thereafter, the film is subjected to an electron beam processing means in a zone 31 to cross link this film polymer. Finally, the film is heat set in a processing zone 32 at a temperature of about 200° to about 250° F. under stretch-tension before the product film 33 is coiled on a take-up roll 26'. The product film 33 is more stable at higher temperatures than observed with the untreated film. For example, the untreated film in the case of an EVA/polyethylene coextruded film softens at about 150° F., yet after being so processed as shown in FIG. 8 and described above, the product film 33 is typically heat stable to about 220° F. and can be steam sterilized. However, such a prior art film 33 does not have the combined characteristics of a film 25 of this invention. It can be seen that, by comparison of the respective processes shown in FIG. 8 and in FIG. 9 to one another, the process of the invention as shown in FIG. 9 is surprisingly simple and effective, yet distinctly different, and produces a product film with substantially different and unexpected features.

Either two-layered product film 39, or a three-layered product film 15, both produced by the process of this invention is typically and preferably characterized by having:

(a) a uniaxial heat shrinkability ratio in the of about 1.5:1 to about 4:1 at a temperature in the range of about 40° to about 80° C.;

(b) an elastic recovery (or elasticity), after such a so stretched film structure has been so heat shrunk at a temperature in said range, of at least about 75 percent after being elongated at ambient temperature in the direction of said heat shrinking to about twice its heat shrunk length (and then released); and (c) an adherability bond strength for each of such outer layers to a polyethylene film, after such a so stretched film structure has been so heat shrunk at a temperature in said range, of at least about 5 ounces per inch, such bonding being achieved with a polystyrene-polyisoprene-polystyrene based on A—B—A—block copolymer adhesive composition, and more preferably at least about 10 ounces per inch.

For purposes of measuring and evaluating such adherability bond strength, a suitable A—B—A type block copolymer adhesive formulation has the following composition:

Kraton 1117: 100 parts (Kraton 1117 is a trademark for a polystyrene-polyisoprene-polystyrene structure sold by the Shell Oil Company. Kraton 1117 is believed to comprise about 35 Parts A-B copolymer and about 64 parts A-B-A block copolymer).

Wingtack Plus: 120 parts (Wingtack Plus is a solid tackifier resin consisting predominantly of polymerized structures derived from piperpylene and isoprene sold by Goodyear Tire and Rubber Company. It has a softening point of about 95° C.).

Butyl Zimate: 2 parts (Butyl Zimate is a trademark for a zinc di-n-butyldithiocarbamate, an anti-oxidant).

Santovar AL 1 part (Santovar A is a trademark for 2,5-di-tert-amylhydroquinone, an anti-oxidant).

A three-layered film-like structure initially in tubular form can be prepared by coextrusion using circular dies and the bubble process. For example, using a circular die arrangement, a tubular film 43 as shown in FIG. 5 is extruded which has three layers 44, 45, and 46 as shown in FIG. 7. Layers 44 and 46 are comprised, for example, of polyethylene, which layer 45 is comprised of EVA. After which the resulting film is flattened, the edges are trimmed. The product film is then rolled up into two rolls of film. When using a circular die, one must have an interior layer 44 present comprised of polyethylene, If the interior layer is not polyethylene, but rather EVA, then, during tube flattening, the interior layer would stick to itself, which is not here desired, because then one would not be able to wind up two separate rolls of film.

A three-layered, two component film structure initially in a tubular form can also be prepared by coextrusion using circular dies and the bubble process. For example, a two layered tubular film similar to tube 43 is extruded with the EVA layer 45' on the inside and the polyethylene layer 46' on the outside as shown in FIG. 7. When the blown film tube is collapsed, the EVA layer 45' sticks unreleasably to itself. After edge trimming, only one film is rolled up. In the blown film tower, the extruded EVA layer component is conveniently one-half the final thickness of the EVA layer component.

In order to achieve a product multilayered film having a uniaxial stretch rate as desired for a film of this invention, a film structure made by the bubble process is subsequently tentered as taught herein.

After being unilaterally stretched and preferably heat set, a product film structure can be either (a) slit in the direction of its continuous length to provide a plurality of elongated strips of product film structures which are each convolutely wound into a roll, or (b) first convolutely wound into a roll and then the roll is transversely cut at each of a plurality of transversely spaced locations to provide a plurality of smaller rolls of product film structure. Procedure (b) is presently preferred. From such a small roll form, a plurality of generally rectangularly configured film segments are preferably prepared by a successive series of longitudinally spaced, parallel, sequential transverse cuts of the roll material. Such film segments are thus each heat shrinkable in their respective elongated directions.

EMBODIMENT

The practice and advantages of this invention are illustrated by the following example:

EXAMPLE

A three-layer film 10 (see FIG. 1) was coextruded. Layer 11 thereof comprised 15 weight percent of the total weight of coextruded film 10.

Layer 11 had the following composition on a 100 weight percent total composition basis:

| EVA | 68 weight percent |
| LDPE | 24 weight percent |
| Antiblocking Agent | 8 weight percent |

The EVA copolymer contains 28 weight percent vinyl acetate and correspondingly 72 weight percent ethylene on a 100 weight percent total EVA basis. Such EVA is obtained commercially from U.S. Industries as "USI 634-04".

The LDPE was obtained commercially from The Dow Company as "Dow 2045".

The antiblocking agent was silicate concentrate in a polyethylene carrier and is obtained from Ampacet Corp. of Mount Vernon, N.Y. as "Ampacet 10063".

Layer 13 had a composition identical to layer 11 and likewise comprised 15 weight percent of the coextruded film 10.

Layer 12 comprised 70 weight percent of the coextruded film 10 and is comprised of the same EVA as used in layers 11 and 13 (above characterized).

For the coextrusion, a Welex coextruder was used employing two extruders which each have the same length to diameter ratio of 27:1 and which are identified as Extruder #1 and Extruder #2. Extruder #1 was provided with two outlets leading to the melt block die section. One of these outlets feeds the die which forms layer 11, and the other of these outlets feeds the die which forms layer 13. Extruder #2 has a single outlet leading into the melt block die section. This outlet feeds the die which forms layer 12.

The extruder #1 was operated at a screw speed of 14 r.p.m. and a barrel pressure of 2145 psi. Extruder #2 was operated at a screw speed of 48 r.p.m. and its barrel pressure was 3285 psi.

The coextruded film as from the coextruder was passed over a chill roll maintained at 60° F. with a line speed and chill roll speed of 40 ft/min.

In the coextrusion Procedure, the starting ingredients for the outer layers 11 and 13 were weighed and premixed together and the resulting blend was charged to extruder #1. The EVA for the mid layer 12 was charged in particulate form to extruder #2. By operating the screw of extruder #2 at a higher rpm than the screw of extruder #1 the center layer 12 of the resulting coextruded film was 4 mils thick while the thickness of each respective outer layer 11 and 13 was 0.5 mil thus making the total film thickness 5 mils. Film width after edge trimming with rotary knives was 10 inches. The product film was rolled up before being stretched.

A tenter frame was employed to orient and heat set the coextruded film 10 thus produced. Proceeding forwardly from the entrance to the tenter frame, the following progressive tenter frame settings were used, taken transversely across the apparatus at regular longitudinal spacings:

1. 11 inches
2. 16 inches
3. 27 inches
4. 35 inches
5. 45 inches
6. 48 inches
7. 46 inches
8. 38 inches
9. 34 inches
10. 35 inches
11. 35 inches (final film width at take up)

Settings numbered 1-6 (above) taken together comprised a stretching stage that produces a 5:1 stretch ratio. Settings numbered 7-10 taken together comprised a relaxing and a heat setting stage.

During stretching or passage through settings numbered 1-6, the film temperature was maintained at 25° C. During heat setting or passage through settings numbered 7-10, the film temperature was maintained at about 115° F. (46° C.) at a 24 percent reduced stretch ratio (calculated as a 50 inch width reduced to 38 inches).

Film transport speed through the tenter frame was 60 ft/min.

The resulting oriented film was 1.5 mils to 2.0 mils thick. When evaluated in an oven at 200° F., the resulting oriented film shrank 40 percent in five seconds residence time, thus achieving a shrink ratio of about 2.5:1.

When samples of such heat shrunk film were stretched to twice their heat shrunk length and then released for 20 times each, it was found that such samples displayed an elastic recovery of at least about 75 percent.

Samples of such heat shrunk film were coated on each outside face with the polystyrene-polyisoprenepolystyrene adhesive formulation above described herein by first applying the hot melt adhesive to a substrate and then joining such to the film. Such a joining procedures is used because if the hot melt adhesive is directly sprayed or coated on this film, it activates the film and causes the film to prematurely shrink. Using such a joining procedure, each outside face film was found to have an adherability bond strength greater than about 60 ounces per inch to a polyethylene film.

Such a film with such combination of characteristics of heat shrinkability, elasticity after heat shrinking, and glueability, for example, is well suited for use in an elastic waste band structure of a disposable diaper.

The foregoing specification is intended as illustrative and is not to be taken as limiting. Still other variations within the spirit and scope of the invention are possible and will readily present themselves to those skilled in the art.

We claim:

1. A multi-layered film structure having a pair of opposed outside layers and consisting of at least two interbonded layers and not more than three interbonded layers, one said layer thereof being comprised on a 100 weight percent layer basis of:
   about 50 to about 100 weight percent of a polyethylene polymer selected from the group consisting of low density polyethylene and linear low density polyethylene,
   0 to about 50 weight percent of an ethylene/vinyl acetate copolymer having a molecular weight in the range of about 10,000 to about 75,000 and comprised on a 100 weight percent copolymer basis of about 72 to about 91 weight percent ethylene, and correspondingly about 9 to about 28 weight percent of vinyl acetate, and
   0 to about 10 weight percent of a filler-based antiblocking agent, and a second said layer thereof being comprised of said ethylene/vinyl acetate copolymer, and when said film structure contains a third said layer, said third layer is comprised of said polyethylene polymer, and said second layer is positioned between said first layer and said third layer, and wherein the ratio of the thickness of each one said first layer and of said third layer when present to said second layer is in the range of about 1:5 to about 1:20;

said film structure being further characterized by having been uniaxially stretched to a stretch ratio in the range of about 3:1 to 6:1 while maintaining a temperature in the range of about 20° to about 50° C., a uniaxial heat shrinkability ratio in the range of about 1.5:1 to about 4:1 at a temperature in the range of about 40° to about 80° C., an elastic recovery, after said so stretched film structure has been so heat shrunk at a temperature in said range, of at least about 75 percent after being elongated at ambient temperature in the direction of said heat shrinking to about twice its heat shrunk length; and an adherability bond strength for each of said outer layers to a polyethylene film, after said so stretched film structure has been so heat shrunk at a temperature in said range, of at least about 5 ounces per inch, such bonding being achieved with a polystyrene-polyisoprene-polystyrene adhesive composition.

2. The film structure of claim 1 wherein, after said uniaxial stretching, said film structure is heat set at a temperature in the range of about 38° to about 55° C.

3. The film structure of claim 2 which is comprised of three said layers and which is in the form of a generally rectangular strip, and said strip is so uniaxially heat shrinkable in its longitudinal direction.

4. The film structure of claim 2 which is comprised of three said layers and which has a thickness in the range of about 1 to about 2.5 mils.

* * * * *